United States Patent
Patel et al.

(10) Patent No.: US 11,359,554 B2
(45) Date of Patent: Jun. 14, 2022

(54) SYSTEM AND METHOD FOR FUEL NOZZLE CLEANING DURING ENGINE OPERATION

(71) Applicant: General Electric Company, Schenectady, NY (US)

(72) Inventors: Nayan Vinodbhai Patel, Liberty Township, OH (US); Michael Scott McCambridge, Loveland, OH (US); Eric John Kress, Loveland, OH (US); Kevin Richard Graziano, Cincinnati, OH (US); Brendon Matthew Leeker, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 149 days.

(21) Appl. No.: 16/809,797

(22) Filed: Mar. 5, 2020

(65) Prior Publication Data
US 2021/0277838 A1 Sep. 9, 2021

(51) Int. Cl.
*F02C 9/32* (2006.01)
*F02M 65/00* (2006.01)

(52) U.S. Cl.
CPC ............. *F02C 9/32* (2013.01); *F02M 65/008* (2013.01); *F05D 2220/323* (2013.01); *F23D 2209/30* (2013.01)

(58) Field of Classification Search
CPC ...... F02C 9/28; F02C 9/32; F02C 9/40; F02C 7/232; F02M 65/008; F23D 2209/30; F23R 3/343; F23R 2900/0004
See application file for complete search history.

(56) References Cited

U.S. PATENT DOCUMENTS

| | | | |
|---|---|---|---|
| 5,809,771 A | 9/1998 | Wemberg | |
| 6,877,306 B2 | 4/2005 | Wemberg et al. | |
| 6,959,535 B2 | 11/2005 | Mancini et al. | |
| 8,340,886 B2 | 12/2012 | Nenmeni et al. | |
| 9,638,422 B2 | 5/2017 | Hall et al. | |
| 9,650,955 B2 | 5/2017 | Sabelhaus et al. | |
| 9,650,960 B2 | 5/2017 | Vertenoeuil et al. | |
| 2008/0154474 A1* | 6/2008 | Lasillo | F02C 7/22 701/100 |
| 2012/0192542 A1 | 8/2012 | Chillar et al. | |

(Continued)

FOREIGN PATENT DOCUMENTS

EP 2535644 A2 12/2012

*Primary Examiner* — Katheryn A Malatek
(74) *Attorney, Agent, or Firm* — Venable LLP; Peter T. Hrubiec; Michele V. Frank

(57) ABSTRACT

A method and system for cleaning a fuel nozzle during engine operation is provided. Operations include operating the compressor section to provide the flow of oxidizer at a first oxidizer flow condition to the combustion chamber, wherein the first oxidizer flow condition comprises an environmental parameter; operating the fuel system at a first fuel flow condition to produce a fuel-oxidizer ratio at the combustion chamber; comparing the environmental parameter to a first environmental parameter threshold; and transitioning the fuel system to a second fuel flow condition corresponding to a cleaning condition at the fuel nozzle if the environmental parameter is equal to or greater than the first environmental threshold.

16 Claims, 7 Drawing Sheets

(56) References Cited

U.S. PATENT DOCUMENTS

2015/0059353 A1* 3/2015 Asai .................... F02C 3/22
  60/778
2015/0321767 A1* 11/2015 Kamath ................ B64D 37/30
  244/135 C
2019/0203645 A1 7/2019 Kleckler et al.

* cited by examiner

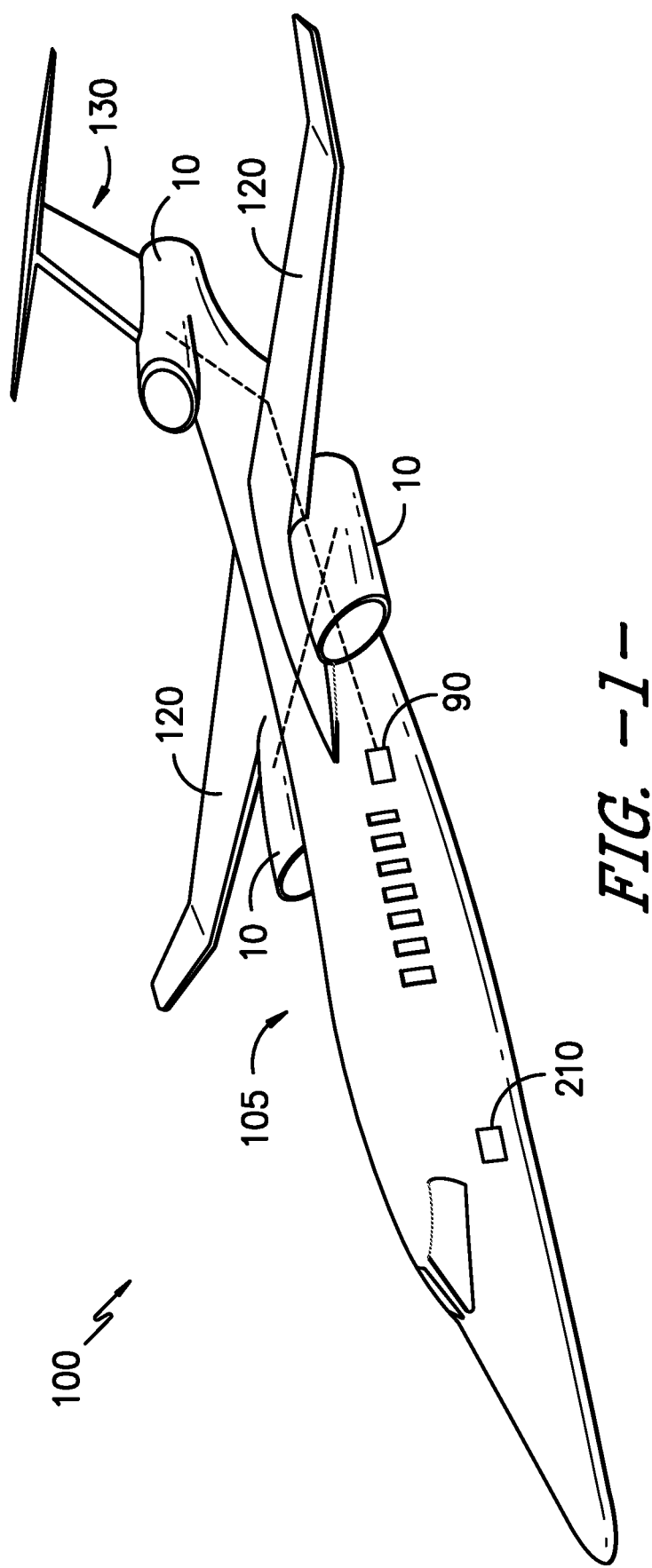
FIG. -1-

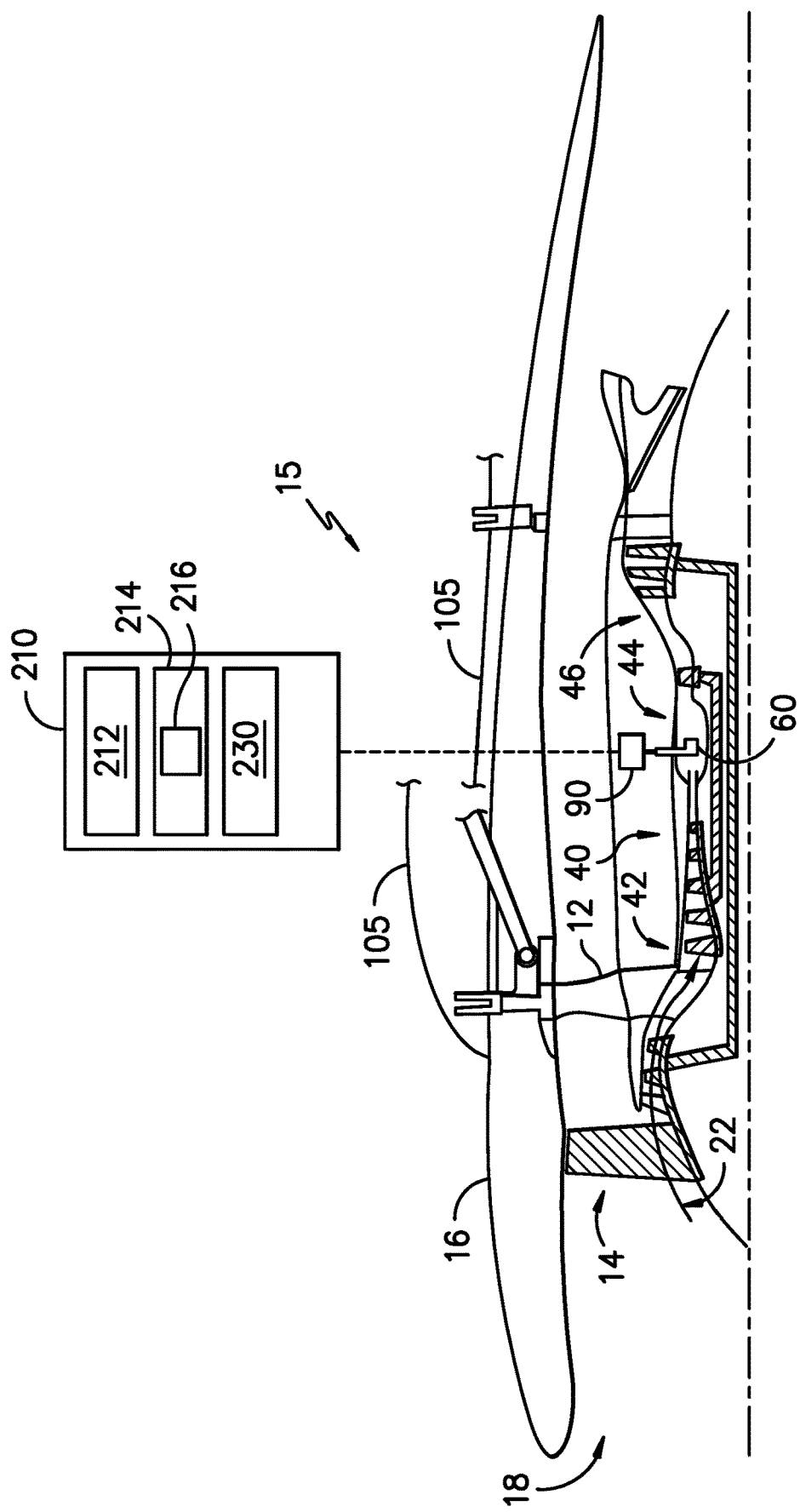
FIG. -2-

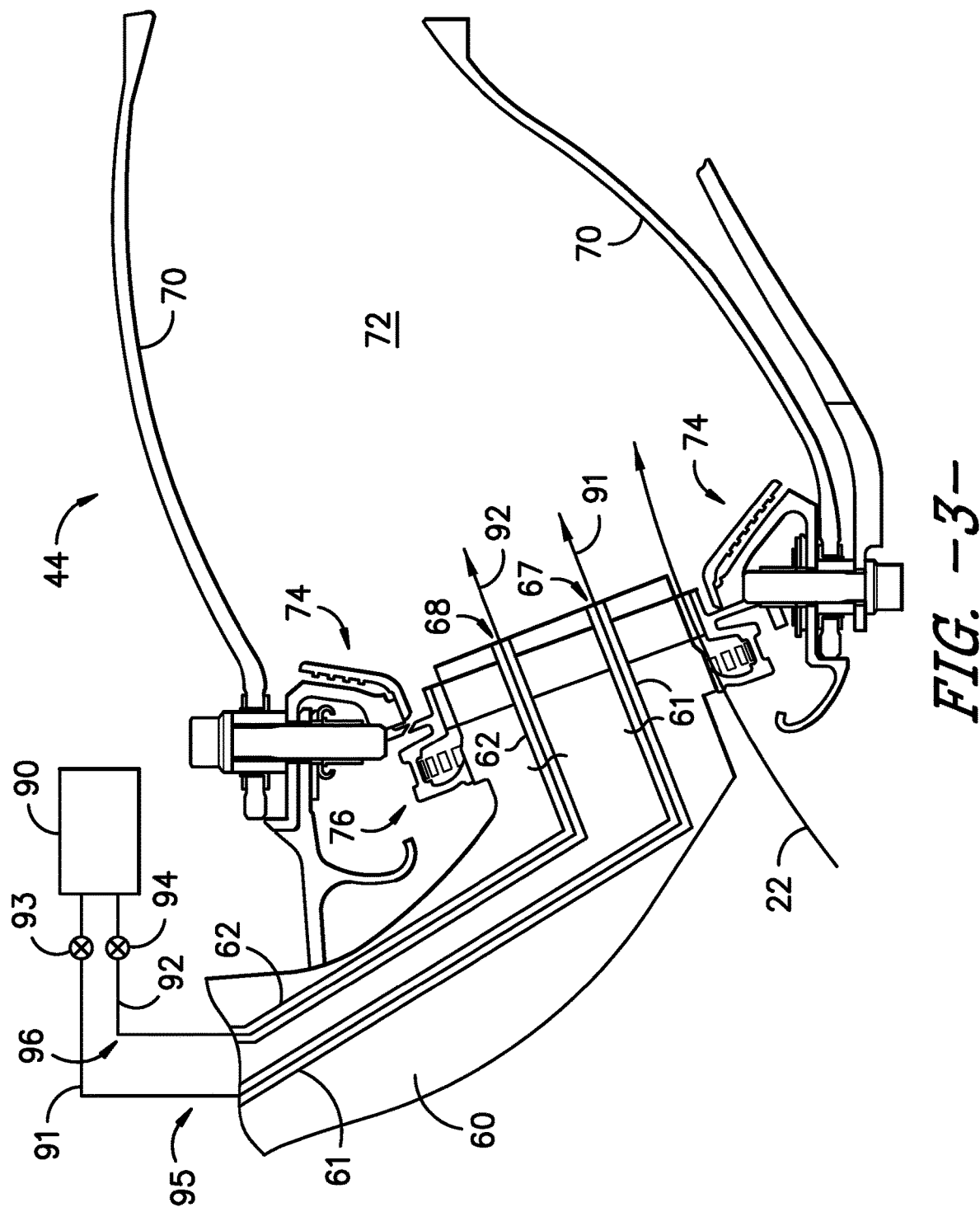
FIG. -3-

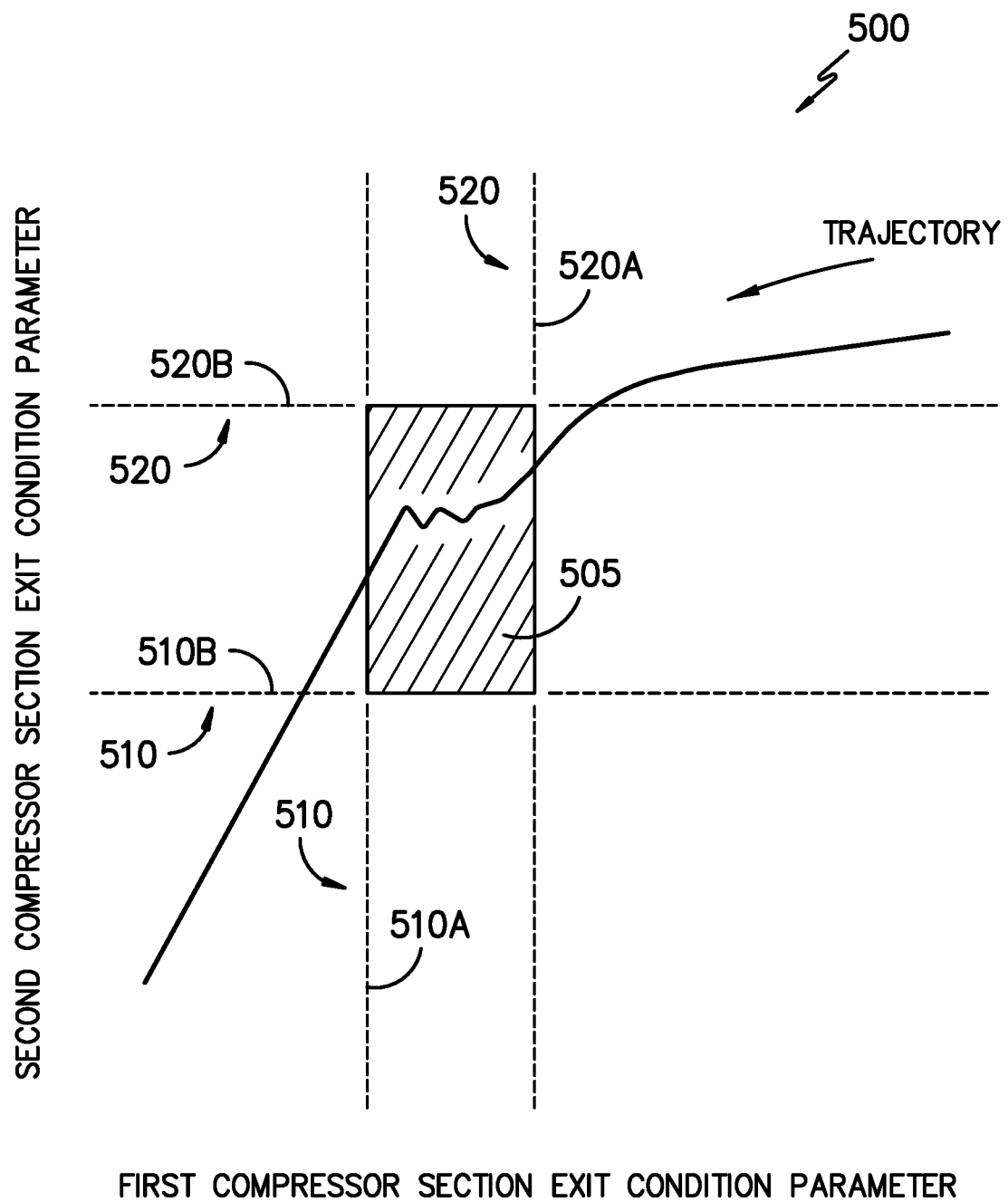
FIG. -4-

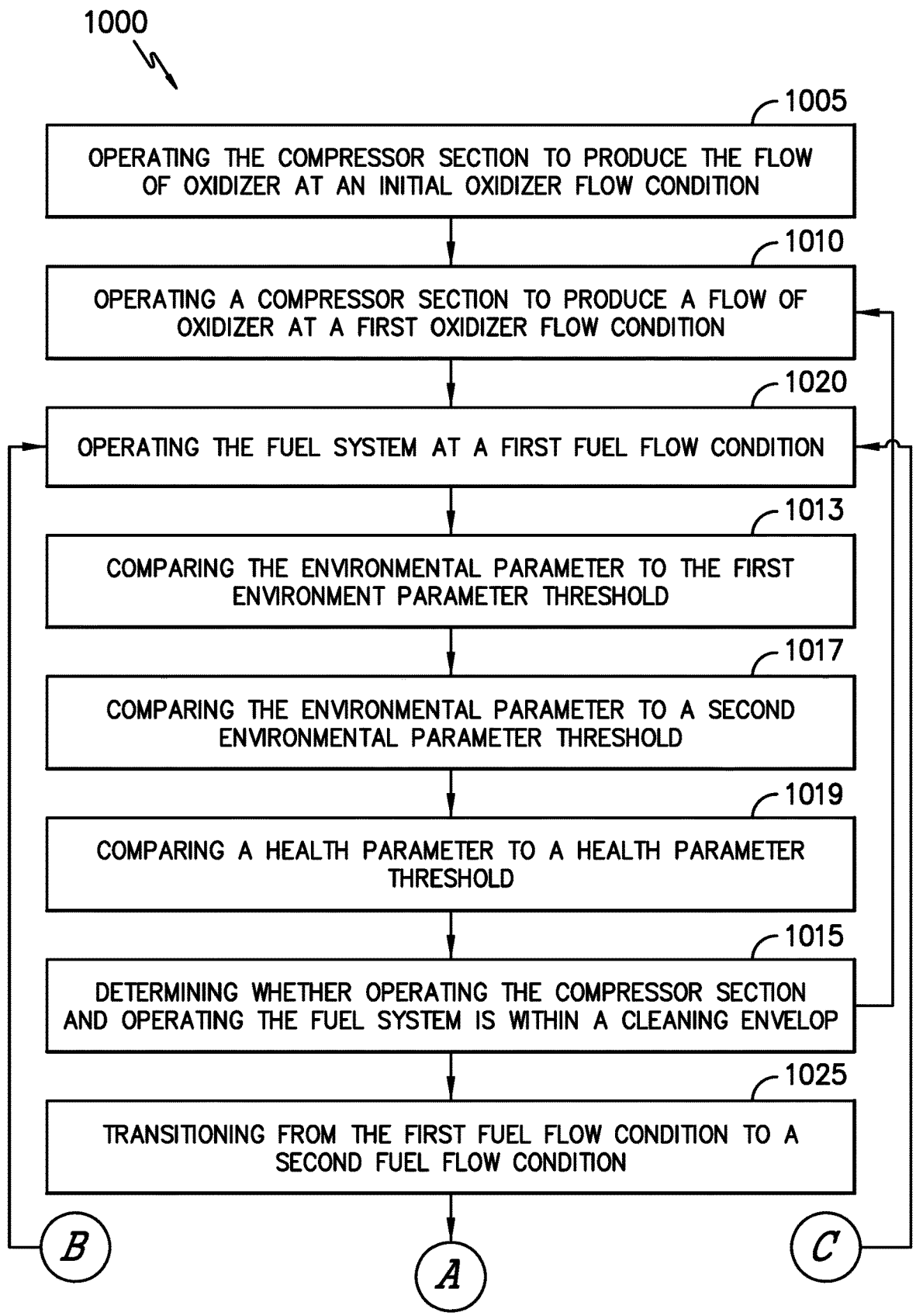
FIG. −5A−

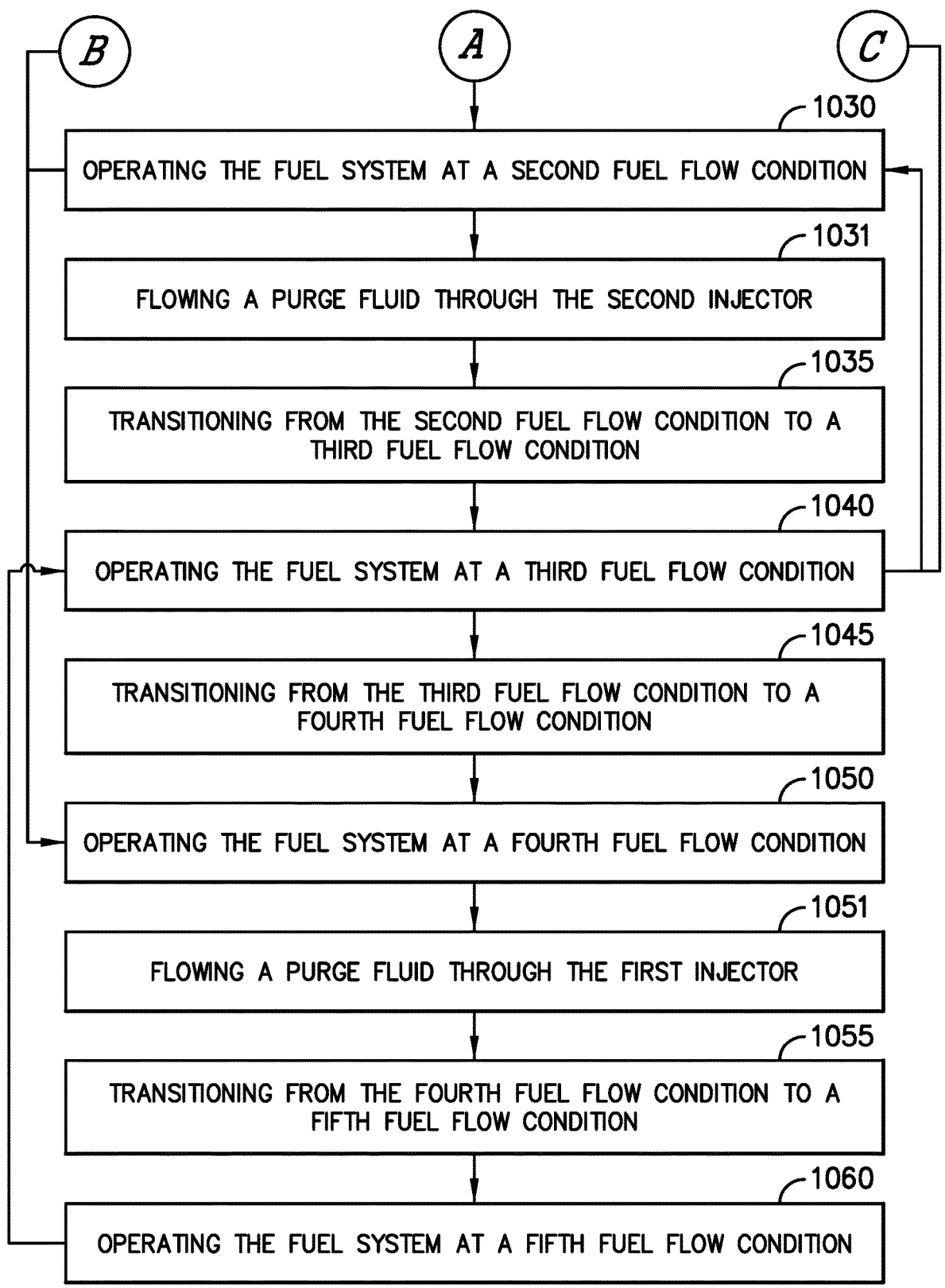
FIG. -5B-

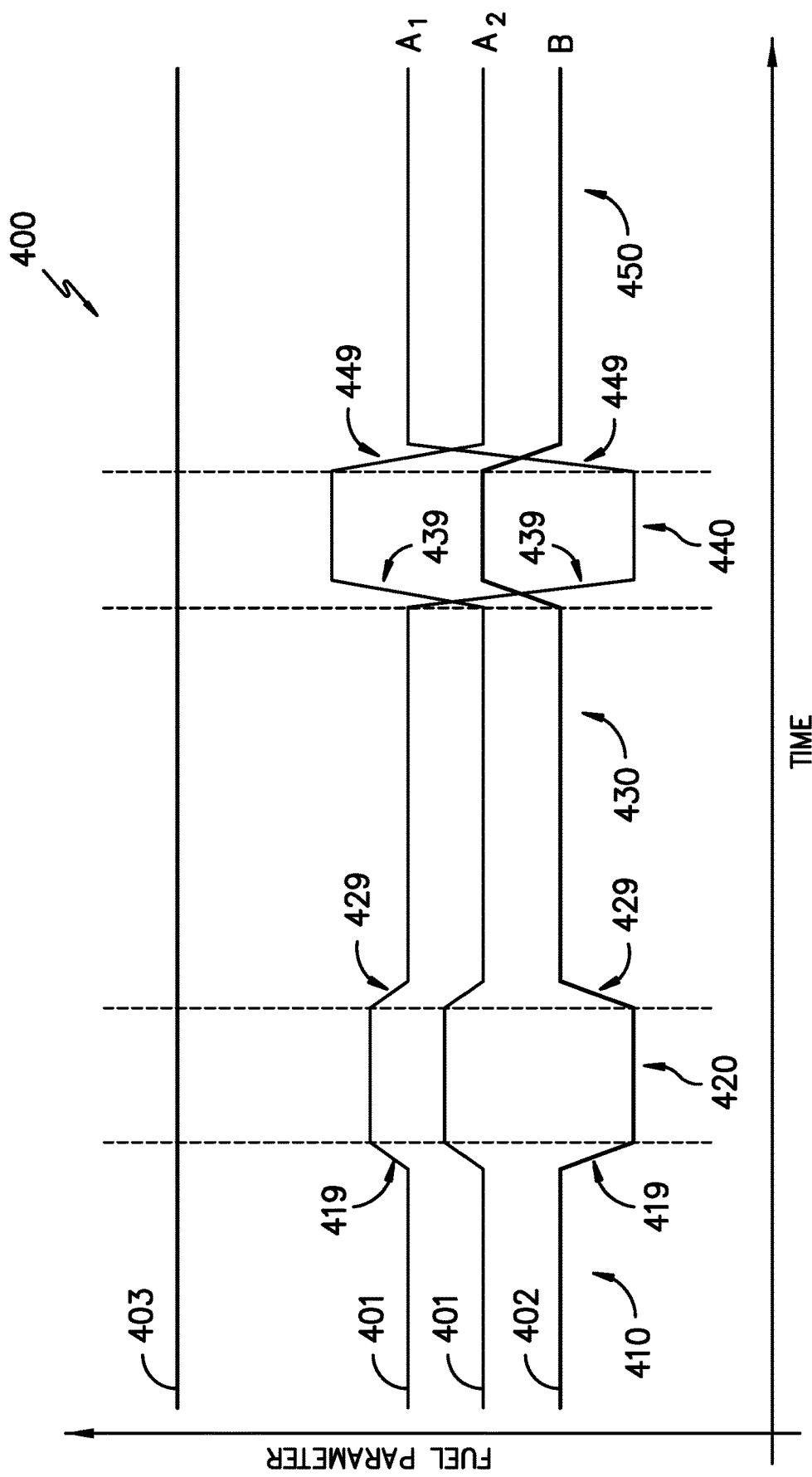
FIG. -6-

SYSTEM AND METHOD FOR FUEL NOZZLE CLEANING DURING ENGINE OPERATION

FIELD

The present subject matter relates generally to methods and systems for fuel nozzle cleaning during operation of a heat engine. Particular aspects of the present subject matter relate to methods and systems for fuel nozzle cleaning during operation of a gas turbine engine. Still particular aspects of the present subject matter relate to fuel nozzle cleaning during in-flight operation of a propulsion system.

BACKGROUND

Heat engines, such as gas turbine engines, experience fuel coking within a fuel nozzle when fuel inside the fuel nozzle is exposed to high temperatures during engine operation. Fuel coking may particularly occur during low fuel-flow conditions and with exposure to high temperatures during operation. Fuel coking in the fuel nozzle may also occur following engine shutdown, such as due to thermal soaking of the fuel nozzle and residual fuel within the fuel nozzle following shutdown.

Fuel coke build-up may adversely affect fuel nozzle performance, and overall engine performance, durability, or operability, such as by undesirably restricting or clogging fuel flow through the fuel nozzle. Such restricted fuel flow may generally result in uneven spray patterns, which may accelerate deterioration of components at the combustion section and/or turbine section. Component deterioration may result from increased circumferential or radial thermal gradients, or hot spots, or damage caused by increased combustion dynamics, such as pressure oscillations, acoustics, or other uneven wear and damage. Such restricted fuel flow may also cause pressure build-up at a fuel system, such as to reach fuel system pressure limits, which may cause loss of engine thrust control.

As such, there is a need for improved cleaning system and methods that address these issues.

BRIEF DESCRIPTION

Aspects and advantages of the invention will be set forth in part in the following description, or may be obvious from the description, or may be learned through practice of the invention.

An aspect of the present disclosure is directed to a heat engine including a compressor section configured to provide a flow of oxidizer to a combustion chamber; a fuel nozzle including a plurality of fuel injection openings, wherein the fuel nozzle is configured to provide a first fuel flow to the combustion chamber through one or more of the fuel injector openings and a second fuel flow to the combustion chamber through one or more of the fuel injector openings different from the first fuel flow; a fuel system including a first conduit configured to provide the first fuel flow to the combustion chamber and a second conduit configured to provide the second fuel flow to the combustion chamber, wherein the fuel system is configured to provide the first fuel flow variably and separate from the second fuel flow; and a controller configured to execute operations, the operations including operating the compressor section to provide the flow of oxidizer at a first oxidizer flow condition to the combustion chamber, wherein the first oxidizer flow condition comprises an environmental parameter; operating the fuel system at a first fuel flow condition to produce a fuel-oxidizer ratio at the combustion chamber; comparing the environmental parameter to a first environmental parameter threshold; and transitioning the fuel system to a second fuel flow condition corresponding to a cleaning condition at the fuel nozzle if the environmental parameter is equal to or greater than the first environmental threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of an embodiment of an aircraft according to an aspect of the present disclosure;

FIG. 2 is a schematic cross-sectional view of an embodiment of a heat engine including a controller configured to execute steps of a method according to aspects of the present disclosure;

FIG. 3 is a schematic view of an exemplary combustion and fuel system according to an aspect of the present disclosure;

FIG. 4 is an exemplary graph depicting a cleaning condition at which steps of the method of FIGS. 5A-5B may be performed;

FIGS. 5A-5B are a flowchart outlining steps of a method for fuel nozzle cleaning during engine operation according to aspects of the present disclosure; and FIG. 6 is an exemplary graph depicting portions of the method for fuel nozzle cleaning during engine operation according to aspects of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of a method and system for cleaning a fuel nozzle during engine operation are provided herein. Embodiments of the method and system provide control and execution of conditions allowing for removal of fuel deposits, such as fuel coke, from within a fuel nozzle during operation of an engine. The fuel deposits may be broken-down into lighter and/or smaller particles via thermal decomposition, allowing for their egress from the fuel nozzle. In various embodiments, the fuel deposits may be forcibly or abrasively removed via a cleaning fluid and/or fluid purge. In certain embodiments, the methods and systems provided herein allow for fuel nozzle cleaning during in-flight operation of the engine as an aircraft propulsion system. Embodiments of the methods and systems depicted and described herein may include steps for operating a fuel system to thermally decompose deposits at the fuel nozzle and determining conditions for executing cleaning steps. Embodiments of the methods and systems provided herein may improve life, durability, maintenance, and/or performance of other combustion section and/or turbine section components, such as by reducing or eliminating uneven fuel nozzle spray patterns, reducing circumferential and/or radial thermal gradient variations (e.g., reducing hot spots), or reducing other conditions that may cause uneven or increased wear or deterioration of certain combustion section or turbine section components.

Referring now to the drawings, in FIG. 1, an exemplary embodiment of an aircraft 100 including a propulsion system 10, a fuel nozzle 60, a fuel system 90, and a controller 210 according to an aspect of the present disclosure is provided. The aircraft 100 includes an aircraft structure or airframe 105. The airframe 105 includes a fuselage 110 to which wings 120 and an empennage 130 are attached. The propulsion system 10 according to aspects of the present disclosure is attached to one or more portions of the airframe. In various embodiments, the propulsion system 10 may be configured generally as any appropriate propulsion or power generation system including a fuel nozzle and fuel system configured to provide fuel to a combustion or detonation chamber according to aspects of the disclosure provided herein. In certain embodiments, the propulsion system 10 is configured as a turbofan, turboprop, turbojet, or turboshaft engine, or ramjet or supersonic combustion ramjet engine, or hybrid-electric engine, or combinations thereof. In certain instances, the propulsion system 10 is attached to an aft portion of the fuselage 110. In certain other instances, the propulsion system 10 is attached underneath, above, or through the wing 120 and/or portion of the empennage 130.

As described in further detail herein, the aircraft 100 including the propulsion system 10 is configured to execute operations or manoeuvres during ground operation, takeoff, and in-flight. The aircraft and engine operations or manoeuvres may include those associated with a landing-takeoff (LTO) cycle. The LTO cycle includes idle, takeoff, climb, and approach. The LTO cycle may generally include certain thrust output settings from the engine 15. However, in various embodiments, aircraft 100 and propulsion system 10 operations or manoeuvres may include other or additional steps providing for changes in engine thrust output or power generation, altitude or attitude, or combinations thereof, resulting in changes to ambient and inlet parameters at the propulsion system 10 or aircraft 100. Portions of the LTO cycle may further be associated with certain emissions or noise limits, such as, but not limited to, limits to emissions of oxides of nitrogen ($NO_x$), carbon monoxide (CO), carbon dioxide ($CO_2$), unburned hydrocarbons (UHC), or smoke, or perceived acoustic noise, from the propulsion system 10.

Referring now to FIG. 2, an embodiment of a heat engine 15 is provided. The propulsion system 10 of FIG. 1 may include the engine 15 provided in FIG. 2. In various embodiments, the engine 15 may be configured as a propulsion system, a power generation system, a hybrid electric engine, or other heat engine apparatus including a fuel system 90 configured to provide liquid and/or gaseous fuel to a fuel nozzle 60 according to aspects of the present disclosure. The engine 15 may generally be configured as a turbo machine, such as a gas turbine engine including a compressor section 42, a combustion section 44, and a turbine section 46 in serial flow arrangement. Certain embodiments of the engine 15 are configured as a turbofan or turbojet engine including a fan assembly 14 operatively connected to a core engine 40. Still various embodiments may define the engine 15 as an open rotor, propfan, or Brayton cycle machine. Still further, certain embodiments may include a power gear assembly operably coupled to the fan assembly 14 and at least a portion of the turbine section 46. The core engine 40 is positioned in serial flow arrangement with the fan assembly 14.

The engine 15 includes an inlet 18 through which a flow of oxidizer, depicted schematically by arrows 22, enters the engine 15. In particular, the flow of oxidizer 22 enters the core engine 40. The flow of oxidizer 22 is compressed by the compressor section 42 before entering the downstream combustion section 44. The combustion section 44 includes a fuel nozzle 60 according to embodiments described herein in regard to FIG. 3. A fuel system 90 provides a first fuel flow and a second fuel flow to the fuel nozzle 60. During certain operations of the engine 15 according to aspects of the disclosure provided herein, the first fuel flow and/or second fuel flow is mixed with the flow of oxidizer 22 and burned or detonated to produce combustion gases. The combustion gases release energy to drive the turbine section 46, which drives the compressor section 42.

Referring now to FIG. 3, an exemplary embodiment of a combustion section 44 including a fuel nozzle 60 and the fuel system 90 according to an aspect of the present disclosure is provided. The combustion section 44 may be configured as any suitable type of combustor, such as, but not limited to, a deflagrative combustor, a detonation combustor (e.g., pulse detonation, rotating detonation, etc.), a trapped vortex combustor, can-type combustor, can-annular type combustor, annular combustor, volute combustor, or combinations thereof. The combustion section 44 includes a detonation or combustion chamber 72 at which a liquid and/or gaseous fuel is burned with oxidizer 22, such as described herein. The fuel nozzle 60 is configured as any appropriate type of fuel nozzle including a first injector 61 and a second injector 62. The first injector 61 is configured to receive a first fuel flow from the fuel system 90, depicted schematically by arrows 91. The second injector 62 is configured to receive a second fuel flow from the fuel system 90, depicted schematically by arrows 92. The first injector 61 is configured to provide the first fuel flow 91 to the combustion chamber 72. The fuel nozzle 60 includes a plurality of fuel injection openings through which respective flows of fuel are provided from the fuel nozzle 60 to the combustion chamber 72. The plurality of fuel injection openings includes a first opening 67 corresponding to the first injector 61 and a second opening 68 corresponding to the second injector 62.

In certain embodiments, the combustion section 44 includes a plurality of the fuel nozzle 60, e.g., in circumferential arrangement, or other appropriate arrangement. In still certain embodiments, the fuel nozzle 60 is configured as a rich burn, lean burn, or other appropriate type fuel nozzle. In particular embodiments, the fuel nozzle 60 includes one or more of the first injector 61 and one or more of the second injector 62. In certain embodiments, the first injector 61 is configured as a main fuel injector and the second injector 62 is configured as a pilot fuel injector. During nominal operation of the engine 15, fuel system 90, and fuel nozzle 60, the main fuel injector may be configured to provide larger fuel flows to the combustion chamber 72 compared to the pilot fuel injector. For instance, in certain operating conditions of the engine (e.g., startup or low power), approximately 100% of the fuel to the combustion chamber 72 may egress through the pilot fuel injector. In other instances, in certain operating conditions of the engine (e.g., greater than low power, such as mid-power or high-power conditions), most fuel may egress through the main fuel injector. However, during certain conditions such as provided herein, fuel flows through the respective injectors 61, 62 will be desirably altered or adjusted away from nominal conditions. It should be appreciated that, in various embodiments, the first injector 61 may be configured as a pilot fuel injector and the second injector 62 may be configured as a main fuel injector.

The fuel system 90 is configured to provide the first fuel flow 91 to the first injector 61 variably and separate from the second fuel flow 92 second injector 62. In certain embodiments, the fuel system 90 includes a first conduit 95 in fluid communication with the first injector 61 of the fuel nozzle 60 and a second conduit 96 in fluid communication with the second injector 62 of the fuel nozzle 60. The fuel system 90 is configured to desirably allow and restrict egress of the first fuel flow 91 and the second fuel flow 92 to the fuel nozzle 60 separately from one another, such as described herein. In one embodiment, the fuel system 90 includes a first valve 93 positioned at the first conduit 95 and a second valve 94 positioned at the second conduit 96, such as to allow for selective egress and restriction of the respective first fuel flow 91 and second fuel flow 92 to the fuel nozzle 60 based on one or more steps of the method provided herein.

In various embodiments, the combustion section 44 includes a plurality of combustor components generally defining the combustion chamber 72 or other portions exposed to the hottest portions of the combustion section 44. Such combustor components may include a liner assembly 70, a heat shield assembly 74, swirler 76, or the fuel nozzle 60. As further described herein, embodiments of the method may include a health parameter corresponding to a temperature or thermal gradient at one or more combustor components. In certain embodiments, the health parameter corresponding to the combustor component or turbine section is associated with limiting an undesired temperature differential or gradient along the individual component or relative to a plurality of the component (e.g., a circumferential or radial plurality of the component, such as an annular combustor). The health parameter may correspond to desired limits associated with mitigating formation of hot spots at the combustion section 44 or turbine section 46.

In still various embodiments, the health parameter may correspond to a life, durability, or other structural integrity parameter, such as desired structural life or coating retention period, associated with the combustor component as a function of combustor stability. In still other embodiments, the health parameter may correspond to an emissions or noise parameter at the combustion section 44, such as, but not limited to, a desired or required emissions output range or perceived noise range during operation of the engine 15.

In certain embodiments, the desired or required emissions or perceived noise output range is a function of engine or aircraft operation. For instance, the desired or required emissions or perceived noise output range may correspond to an emissions limit corresponding to the LTO cycle, a local emissions requirement, or other regulatory requirement.

Referring now to FIG. 4, a graph 500 depicting changes in compressor section exit conditions corresponding to fuel-oxidizer combustion is provided. The graph 500 depicts an embodiment of a cleaning envelop at area 505 at which one or more cleaning methods described herein may be executed during operation of an engine, such as the engine 15 (FIG. 2), or such as the propulsion system 10 during operation and/or flight of the aircraft 100 (FIG. 1).

The graph 500 includes a first compressor section exit condition parameter versus a second compressor section exit condition parameter. In various embodiments, the first and second compressor section exit condition parameters correspond to a location at the engine downstream of the compressor section and upstream of the combustion chamber. For instance, the first and second compressor section exit condition parameters may generally correspond to the flow of oxidizer to be mixed with fuel and burned at the combustion chamber. In various instances, the compressor section exit condition parameter may be referred to as a Station 3 parameter at the engine.

In various embodiments, the first compressor section exit condition parameter includes a compressor section exit pressure. In certain embodiments, the compressor section exit pressure includes a static pressure parameter. However, in other embodiments, the compressor section exit pressure parameter is any appropriate pressure parameter corresponding to the flow of oxidizer to be mixed with fuel and burned at the combustion chamber. In still various embodiments, the second compressor section exit condition parameter includes a compressor section exit temperature of the flow of oxidizer.

Referring now to FIGS. 5A-5B, flowcharts outlining exemplary steps of a method for fuel nozzle cleaning during engine operation is provided (hereinafter, "method 1000"). Embodiments of the method 1000 provided herein allow for fuel nozzle cleaning while maintaining a desired combustion section and/or engine power output or thrust output suitable during engine operation. Certain embodiments of the method 1000 may provide particular benefits, such as fuel nozzle cleaning during aircraft operation. As described in various embodiments herein, aircraft operation may include, but is not limited to, conditions generally corresponding to the LTO cycle. However, other aircraft operation may include flight conditions generally.

Referring now to the flowchart at FIGS. 5A-5B, and in conjunction with the graph 500, the method 1000 includes at 1010 operating a compressor section to produce or provide a flow of oxidizer at a first oxidizer flow condition to the combustion chamber. The first oxidizer flow condition may generally include an environmental parameter corresponding to a range within which the flow of oxidizer allows for cleaning of the fuel nozzle while operating the engine at a desired fuel-oxidizer ratio. In certain embodiments, the environmental parameter includes one or more of the first compressor section exit temperature parameter, the second compressor section exit temperature parameter, the first compressor section exit pressure parameter, the second compressor section exit pressure parameter, or combination thereof. In various embodiments, the desired fuel-oxidizer ratio includes any fuel-oxidizer ratio permitting continued operation and/or performance of the engine. In certain embodiments, the desired fuel-oxidizer ratio allows continued operation and/or performance of the engine relative to a fuel-oxidizer condition immediately preceding fuel nozzle cleaning during engine operation. In still particular embodiments, the desired fuel-oxidizer ratio includes maintaining a desired fuel-oxidizer ratio across two or more fuel flow conditions, such as described herein.

Referring to the graph 500 in FIG. 4, the environmental parameter of the first oxidizer flow condition at 1010 may generally correspond to a temperature and a pressure of the flow of oxidizer at the combustion section and from the compressor section. As described above in an embodiment, the environmental parameter corresponds to the first flow of oxidizer downstream of the compressor section and upstream of the combustion chamber. For example, the environmental parameter may correspond to a Station 3 oxidizer temperature (e.g., T3) and oxidizer pressure (e.g., P3) at the heat engine.

In certain embodiments, the graph 500 in FIG. 4 includes a first environmental parameter threshold, depicted at line 510. In various embodiments, the first environmental parameter threshold defines a lower limit at or above which the cleaning envelop 505 is defined and a cleaning method is executed during operation of the engine. In one embodiment, the first environmental parameter threshold 510 corresponds to the first compressor section exit condition parameter, such as depicted at line 510A in FIG. 4. In another embodiment, the first environmental parameter threshold 510 corresponds to the second compressor section exit condition parameter, such as depicted at line 510B in FIG. 4.

In still certain embodiments, the graph 500 includes a second environmental parameter threshold, depicted at line 520 in FIG. 4. In various embodiments, the second environmental parameter threshold defines an upper limit at or below which the cleaning envelop is defined and a cleaning method is executed during operation of the engine. In one embodiment, the second environmental parameter threshold 520 corresponds to the compressor section exit condition parameter, such as depicted at line 520A in FIG. 4. In another embodiment, the second environmental parameter threshold 520 corresponds to the second compressor section exit condition parameter, such as depicted at line 520B in FIG. 4.

In various embodiments, the environmental parameter thresholds correspond to conditions at which the flow of oxidizer allows for thermal decomposition of deposits of fuel within the fuel nozzle. The first oxidizer flow condition may particularly correspond to temperature and pressure conditions at the fuel nozzle that allow for thermal decomposition of deposits of fuel or other matter (e.g., carbon buildup, fuel coke, etc. within the first injector and the second injector). The environmental parameter may further correspond to pressure conditions at which the fuel nozzle and/or fuel system may allow for purge of fuel deposits, such as fuel coke, from the fuel nozzle into the combustion chamber.

In still certain embodiments, the environmental parameter thresholds correspond to conditions at which combustion is sustained or sustainable, such as to provide the flow of oxidizer to the combustion chamber above a first temperature threshold and a first pressure threshold. The environmental parameter thresholds may furthermore correspond to conditions at which desired combustion stability or performance is maintained, or certain combustion acoustics, pressure oscillations or fluctuations, lean blowout, emissions, or other adverse conditions, are mitigated. In various embodiments, the environmental parameter thresholds may correspond to one or emissions or noise limits corresponding to certain portions of the LTO cycle.

It should be appreciated that the environmental parameter includes one or more particular ranges of temperature and/or pressure of the flow of oxidizer downstream of the compressor section (e.g., at the fuel nozzle, or at the combustion chamber). Particular ranges of environmental parameter provided herein may be critical and non-obvious relative to one or more steps of the method 1000 provided herein, such as to allow for fuel nozzle cleaning during engine operation according to one or more embodiments provided herein. Various ranges provided herein may particularly allow for purge or other removal of fuel coke or debris from the fuel nozzle during operation of the engine. In certain embodiments, the first environmental parameter threshold includes a temperature at or above approximately 550 degrees Fahrenheit (approximately 287 degrees Celsius). In still certain embodiments, the first environmental parameter threshold includes a pressure at or above approximately 135 pounds per square inch (psia) (approximately 930 kilo-Pascals (kPa)). In other embodiments, the first environmental parameter threshold is at or above approximately 600 F (approximately 315 C). In still other embodiments, the first environmental parameter threshold is at or above approximately 150 psia (approximately 1030 kPa).

In still certain embodiments, the second environmental parameter threshold includes a temperature at or below approximately 1250 degrees Fahrenheit (approximately 680 degrees Celsius). In another embodiment, the second environmental parameter threshold corresponds to a pressure at or below 315 psia (approximately 2172 kPa). In other embodiments, the second environmental parameter threshold is at or below approximately 1100 F (approximately 595 C). In still other embodiments, the second environmental parameter threshold is at or below approximately 300 psia (approximately 2070 kPa). In still another embodiment, the environmental parameter corresponds to a pressure range between approximately 175 psia and approximately 275 psia (between approximately 1205 kPa and approximately 1900 kPa).

Referring now to FIG. 6, an exemplary graph 400 depicting portions of a method for fuel nozzle cleaning during engine operation, (hereinafter, "method 1000") is provided. The graph 400 depicts a plot of a fuel parameter over time. In various embodiments, the fuel parameter corresponds to a fuel flow to a combustion chamber. In certain embodiments, the fuel parameter is fuel flow (e.g., $W_{fuel}$) or a fuel pressure (e.g., $P_{fuel}$) corresponding to fuel flow through the fuel system and fuel nozzle to the combustion chamber. It should be appreciated that, in various embodiments, any applicable parameter may be utilized that is indicative of fuel flow to the combustion chamber.

The graph 400 depicts a plurality of fuel flows (e.g., first fuel flow corresponding to fuel flow rate A, second fuel flow corresponding to fuel flow rate B, etc.) corresponding to a plurality of fuel injection openings at a fuel nozzle. The method 1000 may be performed with an engine, controller, fuel system, and fuel nozzle allowing for independent or separately variable control of fuel flow through two or more conduits and fuel injection openings at the fuel nozzle.

Generally, the fuel nozzle includes a first injector and a second injector, such as described in regard to FIG. 3. The fuel nozzle is configured to provide a first fuel flow to the combustion chamber through the first injector and a second fuel flow to the combustion chamber through the second injector. The fuel system includes a first conduit in fluid communication with the first injector at the fuel nozzle, and a second conduit in fluid communication with the second injector at the fuel nozzle. The fuel system is configured to provide the first fuel flow through a fuel injection opening of the fuel nozzle to the combustion chamber independent or separately variable from the second fuel flow through a second fuel injection opening of the fuel nozzle to the combustion chamber. In certain embodiments, the fuel conduits, the fuel injection openings, or both, correspond to one or more main fuel injectors separate from one or more pilot fuel injectors at the fuel nozzle, such as described elsewhere herein.

Referring back to the graph 400, the method 1000 includes a plurality of fuel flow conditions according to embodiments of the method provided herein. As further described herein, some or all of the steps of the method 1000 provided herein may be stored and executed by a controller (e.g., controller 210) or other computing system. Although certain steps provided herein may be performed in one or more particular sequential orders, it should be appreciated that various embodiments of the method may re-order, re-sequence, omit, include, or iterate certain steps or combinations of steps within the scope of this disclosure.

Referring now to FIGS. 4-6, at 1020, the method 1000 includes operating the fuel system at a first fuel flow condition, such as depicted at 410 on graph 400. The first fuel flow condition 410 includes a first fuel flow rate A, depicted at line 401, corresponding to the first fuel flow 91 through the first injector 61 of the fuel nozzle 60 depicted in FIG. 3. The first fuel flow condition 410 further includes a first fuel flow rate B, depicted at line 402, corresponding to the second fuel flow 92 through the second injector 62 of the fuel nozzle 60 depicted in FIG. 3. The first fuel flow condition 410 provides a fuel-oxidizer ratio, depicted at line 403, at the combustion chamber including the first fuel flow and the second fuel flow.

It should be appreciated that the fuel flow rate A and the fuel flow rate B may generally correspond to one or more of a fuel flow rate of each respective fuel flow. However, in other embodiments, the fuel flow rate A and the fuel flow rate B may each correspond to any appropriate parameter indicative of a volume and/or mass rate or other quantity of fuel from the fuel system through the fuel nozzle.

It should be appreciated that the fuel-oxidizer ratio 403 generally corresponds to a total fuel-oxidizer ratio of a total flow of fuel (e.g., a sum of the fuel flow rate A 401 and the fuel flow rate B 402 in FIG. 6, or a sum of the first fuel flow 91 and the second fuel flow 92 in FIG. 3) provided to the combustion chamber through the plurality of fuel nozzles and the flow of oxidizer provided to the combustion chamber for mixing and burning with the total flow of fuel. The fuel-oxidizer ratio may be calculated based on one or more known methods or otherwise correspond to fuel-oxidizer or fuel-air ratios. In certain embodiments, the fuel-oxidizer ratio may correspond to a fuel-air equivalence ratio, an air-fuel equivalence ratio, or other appropriate parameter corresponding to a total quantity, mass, or volume, or flow rate thereof, of liquid and/or gaseous fuel mixed with a total quantity, mass, or volume, or flow rate thereof, of oxidizer and burned or detonated at the combustion chamber.

The method 1000 includes at 1013 comparing the environmental parameter corresponding to the flow of oxidizer to the first environmental parameter threshold. If the environmental parameter is equal to or greater than the first environmental parameter threshold, such as one or more of the first compressor exit condition parameter or the second compressor exit condition parameter depicted at threshold 510 in graph 500, the method 1000 may proceed to step 1025 to transition the fuel system to a second fuel flow condition, such as depicted at 419 in graph 400. In various embodiments, the method 1000 at 1025 occurs while maintaining an approximately equal or unchanged fuel-oxidizer ratio at the combustion chamber during transition from the first fuel flow condition 410 to the second fuel flow condition 420.

In certain embodiments, the method 1000 includes at 1017 comparing the environmental parameter to a second environmental parameter threshold, such as one or more of the first compressor exit condition parameter or the second compressor exit condition parameter depicted at threshold 520 in graph 500, and proceeding to step 1025 if the environmental parameter is less than or equal to the second environmental parameter threshold.

In one embodiment, the method 1000 includes at 1019 comparing a health parameter to a health parameter threshold. The health parameter corresponds to one or more of a combustor component temperature, a combustion thermal gradient, a combustor stability parameter, or an emissions parameter, such as described in regard to the combustion section 44 in FIG. 3. In various embodiments, the health parameter threshold is a predetermined threshold stored in the memory 214 at the controller 210. In some embodiments, the health parameter is a function of time, aircraft altitude, ambient pressure, or other indicator that may correspond to a change in emissions requirement or durability of the combustor component or turbine section. One or more of the time, aircraft altitude, ambient pressure, or other indicator may define an emissions environment at which the cleaning method is allowed to be executed. In certain embodiments, the method 1000 at step 1025 occurs if the health parameter is within the health parameter threshold.

At 1030, the method 100 includes operating the fuel system at a second fuel flow condition, such as depicted at 420 on graph 400. The second fuel flow condition 420 includes a second fuel flow rate A corresponding to the first fuel flow through the first injector of the fuel nozzle. The second fuel flow condition 420 further includes a second fuel flow rate B corresponding to the second fuel flow through the second injector of the fuel nozzle. The second fuel flow condition 420 provides the fuel-oxidizer ratio at the combustion chamber equal at the first fuel flow condition 410 and the second fuel flow condition 420. Stated differently, a total quantity or mass of fuel provided to the combustion chamber at the first fuel flow condition 410 is equal to the total quantity or mass of fuel provided to the combustion chamber at the second fuel flow condition 420. However, as can be appreciated by the depiction in graph 400, the first fuel flow rate A at the first fuel flow condition 410 differs from second fuel flow rate A at the second fuel flow condition 420, and the first fuel flow rate B at the first fuel flow condition 410 differs from the second fuel flow rate B at the second fuel flow condition 420.

In a certain embodiment, the second fuel flow condition 420 includes the second fuel flow rate A greater than the first fuel flow rate A at the first fuel flow condition 410. In still certain embodiments, the second fuel flow condition 420 includes the second fuel flow rate B less than the first fuel flow rate B at the first fuel flow condition 410. In one embodiment, the method 1000 includes at 1025 transitioning from the first fuel flow condition 410 to the second fuel flow condition 420, such as depicted at 419 in graph 400. In various embodiments, the method 1000 at 1025 occurs while maintaining an approximately equal or unchanged fuel-oxidizer ratio at the combustion chamber during transition from the first fuel flow condition 410 to the second fuel flow condition 420.

In particular embodiments, the second fuel flow rate B is zero at the second fuel flow condition 420. In one embodiment, the second fuel flow is shut-off or diverted from flowing through the second injector at the fuel nozzle. In a still particular embodiment, the second fuel flow is shut-off or diverted from flowing through the fuel nozzle generally. In various embodiments, the method 1000 includes shutting off or diverting the second fuel flow from the fuel nozzle and allowing a non-fuel fluid medium to occupy the second injector of the fuel nozzle. The non-fuel fluid medium may include an oxidizer, such as a portion of the flow of oxidizer corresponding to the environmental parameter as described above, at the second injector. In certain embodiments, operating the fuel system at the second fuel flow condition 420 includes operating the fuel system at a condition at which thermal decomposition of deposits occurs within the second injector.

In certain embodiments, the second fuel flow condition, such as depicted at 420 in graph 400, corresponds to a cleaning condition at the fuel nozzle. The cleaning condition includes an operating condition at which fuel is provided through a portion of the fuel nozzle while a cleaning method is executed at another portion of the fuel nozzle. In one embodiment, the cleaning method includes one or more methods for thermally decomposing deposits of fuel within a fuel injector of a fuel nozzle. The method for thermally decomposing deposits of fuel within the fuel injector, such as the second injector 62 depicted in FIG. 3, includes providing fuel to the combustion chamber through another fuel injector of the fuel nozzle, such as the first injector 61 depicted in FIG. 3. The method further includes transitioning to providing fuel through the other fuel injector, such as the second injector 62, and reducing or shutting off fuel through another fuel injector, such as the first injector 61.

Various embodiments of the cleaning method include providing a cleaning or purge fluid through the fuel injector while another fuel injector at the fuel nozzle provides fuel to the combustion chamber. Various embodiments of the method 1000 include at 1031 flowing a purge fluid through the second injector during the second flow condition at step 1030. In certain embodiments, flowing the purge fluid removes fuel remaining in the second injector after reducing the second fuel flow to zero. In still various embodiments, the method 1000 includes at 1051 flowing a purge fluid through the first injector during the fourth flow condition at step 1050. Correspondingly, flowing the purge fluid removes fuel remaining in the first injector after reducing the first fuel flow to zero. In still certain embodiments, the purge fluid is one or more flows of inert gas, oxidizer, or other appropriate fluid egressed through the second fuel nozzle. In an exemplary embodiment, the purge fluid is provided from the fuel system 90, such as via the first conduit 95 or the second conduit 96. The method 1000 at 1031, 1051 may allow for substantially removing liquid fluid from the respective injector, such as to allow for cleaning, abrasion, thermal decomposition of fuel coke, or another appropriate cleaning process, over a period of time before re-introducing fuel through the respective injector.

In certain embodiments, the method 1000 includes at 1033 flowing a purge fluid through the second injector during or after the second fuel flow condition at step 1030. In still certain embodiments, the method 1000 includes at 1053 flowing a purge fluid through the first injector during or after the fourth fuel flow condition at step 1050. In still other embodiments of the method 1000 at 1033 or 1053, flowing the purge fluid through the fuel injector includes a continuous or intermittent flow of purge fluid through the respective fuel injector for a period of time prior to operating the fuel system at the next fuel flow condition. In still certain embodiments, the method 1000 at 1033 occurs after a period of time following steps at 1031. In other embodiments, the method 1000 at 1053 occurs after a period of time following steps at 1051.

In certain embodiments, the purge fluid is a cleaning fluid or cleaning medium egressed through the respective fuel injector while the other fuel injector is providing fuel to the combustion chamber. The cleaning fluid may an inert gas, oxidizer, liquid and/or gaseous fuel, abrasive particles, detergents, water-based detergents, or other appropriate cleaning medium, or combinations thereof. In certain embodiments, the abrasive particles include one or more alumina, silica, diamond, nut shells, fruit pit stones, or combinations thereof. In still various embodiments, the abrasive particles may be any appropriate size suitable for egress through the fuel injector and the respective opening, such as depicted in FIG. 3. In particular embodiments, the cleaning medium is any appropriate medium suitable for egress through the fuel injector along with fuel deposits or other debris. In some embodiments, the cleaning medium includes particles less than 100 microns in diameter, or less than 80 microns in diameter, 40 microns in diameter, or less than 30 microns in diameter, or less than 20 microns in diameter, or greater than 10 microns in diameter.

In some embodiments, the purge fluid is the flow of oxidizer including the first oxidizer flow condition described herein. In certain embodiments, the fuel nozzle includes one or more features configured to produce local static pressure differences between portions of the fuel injector proximate to the combustion chamber and portions distal to the combustion chamber. Such features may include ramps, openings, divots, depressions, passages, or conduits at the fuel injector, such as at or proximate to a flow path of fuel through the fuel injector.

In other embodiments, the purge fluid is a continuous or intermittent flow of the cleaning fluid, such as to provide a relatively high-pressure purge through the respective fuel injector. In one embodiment, the purge fluid is a continuous or intermittent flow of liquid and/or gaseous fuel through the respective fuel injector as increased or nominal levels of fuel are re-introduced through the fuel injector to the combustion chamber. In some embodiments, the purge fluid includes one or more high-pressure pulse purges of the cleaning fluid through the fuel injector, such as to remove fuel deposits or other debris from the fuel injector.

At 1015, the method 1000 includes determining whether operating the compressor section at the first oxidizer flow condition at 1010 and operating the fuel system at one or more of the fuel flow conditions described in regard to one or more of steps 1020, 1025, 1030, 1035, 1040, 1045, 1050, 1055, or 1060, or other steps herein, is within a cleaning envelop, such as described herein and depicted at area 505 in FIG. 4. In one embodiment, the cleaning envelop is indicative of the flow of oxidizer being at the first oxidizer flow condition such as described herein, the first fuel flow being at a steady-state condition for a predetermined period of time, and further including the health parameter within the health parameter threshold such as described herein. In certain embodiments, the health parameter corresponds to one or more of a compressor section exit temperature of the flow of oxidizer (e.g., $T3_{oxidizer}$), a compressor section exit pressure of the flow of oxidizer (e.g., $P3_{oxidizer}$), a compressor section exit flow rate of the flow of oxidizer (e.g., $W3_{oxidizer}$), a fuel-oxidizer ratio at the combustion chamber, the first fuel flow condition (e.g., $W_{fuelA}$, $P_{fuelA}$, $T_{fuelA}$, etc., $W_{fuelB}$, $P_{fuelB}$, $T_{fuelB}$, etc.), or combinations thereof. In certain embodiments, operating the fuel system at the second fuel flow condition 420 occurs after determining that the first oxidizer flow condition and the first fuel flow condition 410 are within the cleaning envelop.

In still certain embodiments, the cleaning envelop is indicative of the engine 15 and/or aircraft 100 being in an operational or environmental condition or emissions environment allowing for steps of the method 1000 to be performed within limits related to certain emissions or noise limits, such as described herein. In various embodiments, the cleaning envelop provides a threshold at which the adjusted operation of the engine, such as via the different fuel flow conditions described herein, may be performed while operating within desired emissions and/or noise limits and/or durability limits of the combustion section or the turbine section. In certain embodiments, the cleaning envelop may limit the period of time at which one or more of the fuel flow conditions is operated, based on certain emissions and/or noise limits during engine or aircraft operation.

Referring back to FIGS. 5A-5B, in various embodiments, at 1040, the method 1000 includes operating the fuel system at a third fuel flow condition, such as depicted at 430 in graph 400, after operating the fuel system at the second fuel flow condition at 1030. The third fuel flow condition 430 includes a third fuel flow rate A of the first fuel flow through the first injector of the fuel nozzle and a third fuel flow rate B of the second fuel flow through the second injector of the fuel nozzle. In various embodiments, the method 1000 includes at 1035 transitioning from the second fuel flow condition 420 to the third fuel flow condition 430, such as depicted at 429 in graph 400. In various embodiments, the method 1000 at 1035 occurs while maintaining an approximately equal or unchanged fuel-oxidizer ratio at the combustion chamber during transition from the first fuel flow condition 410 to the second fuel flow condition 420.

In certain embodiments, the third fuel flow condition 430 is substantially similar to the first fuel flow condition 410. For example, the third fuel flow condition 430 may include setting or returning the second fuel flow through the second injector at an approximately similar or equal condition as the second fuel flow corresponding to the first fuel flow condition 410. Furthermore, the third fuel flow condition 430 may include setting or returning the first fuel flow through the first injector at an approximately similar or equal fuel parameter as the first fuel flow corresponding to the first fuel flow condition 410.

However, in other embodiments, it should be appreciated that, as fuel deposits, such as fuel coke, should be removed with the increased flow of fuel through the second injector from the second fuel flow condition 420 to the third fuel flow condition 430, the third fuel flow condition 430 may differ in pressure, flow, or another fuel parameter due to increased efficiency of the fuel system, the fuel nozzle, the combustion section, and/or the engine generally. In various embodiments, the first fuel flow condition 410 includes a first pre-cleaning pressure parameter at the second injector. The third fuel flow condition 430 includes a first post-cleaning pressure parameter at the second injector. The first post-cleaning pressure parameter is less than the pre-cleaning pressure parameter. In certain embodiments, the pre-cleaning pressure parameter and the post-cleaning pressure parameter corresponds to a delta pressure (dP) between an exit of the fuel nozzle (e.g., pressure at the combustion chamber) versus an upstream fuel pressure, such as at the fuel system. The decreased dP may be indicative of the cleaned fuel injector. However, in certain embodiments, the method 1000 may include returning from step 1040 to step 1030, or returning from step 1040 to step 1020 then step 1030, or returning from step 1040 to step 1020, step 1025, step 1030, and then 1035, such as to repeat the cleaning process at the second injector.

In still various embodiments, the first fuel flow condition 410 including the pre-cleaning pressure parameter and the third fuel flow condition 430 including the post-cleaning pressure parameter together include a substantially equal pre-cleaning flow rate of fuel relative to a post-cleaning flow rate of fuel.

In various embodiments, the method 1000 includes at 1050 operating the fuel system at a fourth fuel flow condition, such as depicted at 440 in graph 400. The fourth fuel flow condition 440 includes a fourth fuel flow rate A of the first fuel flow through the first injector and a fourth fuel flow rate B of the second fuel flow through the second injector. The fourth fuel flow rate A is less than the first fuel flow rate A, and the fourth fuel flow rate B is greater than the first fuel flow rate B. The fuel-oxidizer ratio at the combustion chamber is approximately equal between the first fuel flow condition 410 and the fourth fuel flow condition 440. In various embodiments, the fuel-oxidizer ratio at the combustion chamber is equal between the first fuel flow condition 410 and the fourth fuel flow condition 440 such as described in regard to the method 1000 at 1020, 1030, or 1040.

In certain embodiments of the method 1000 at 1050, the fourth fuel flow rate A is zero. In still certain instances, the fourth fuel flow rate B is approximately equal to the total fuel flow at the combustion chamber corresponding to the fuel-oxidizer ratio at the combustion chamber, such as described in regard to the method 1000 at 1020, 1030, or 1040. In one embodiment, the method 1000 further includes at 1045 transitioning from the third fuel flow condition 430 to the fourth fuel flow condition 440, such as depicted at 439 in graph 400. In various embodiments, the method 1000 at 1045 occurs while maintaining an approximately equal or unchanged fuel-oxidizer ratio at the combustion chamber during transition from the third fuel flow condition 430 to the fourth fuel flow condition 440. In various embodiments, the method 1000 at 1045 is performed similarly as described in regard to steps 1025 or 1035.

It should be appreciated that the fourth fuel flow condition 440 and transitions thereto and therefrom may occur under similar conditions or requirements at the cleaning envelop described in regard to one or more of steps 1013, 1015, 1017, or 1019, or other steps described herein.

In still certain embodiments, the method 1000 includes at 1060 operating the fuel system at a fifth fuel flow condition, such as depicted at 450 in graph 400. The method 1000 may include operating the fuel system at the fifth fuel flow condition 450 after operating the fuel system at the fourth fuel flow condition 440. The fifth fuel flow condition 450 includes a fifth fuel flow rate A of the first fuel flow through the first injector and a fifth fuel flow rate B of the second fuel flow through the second injector. In certain embodiments, the fifth fuel flow condition 450 may substantially equal one or more of the first fuel flow condition 410 or the third fuel flow condition 430.

However, in other embodiments, such as for reasons stated herein in regard to the first fuel flow condition 410 and the third fuel flow condition 430, it should be appreciated that, as fuel deposits, such as fuel coke, should be removed with the increased flow of fuel through the first injector from the fourth fuel flow condition 440 to the fifth fuel flow condition 450, the fifth fuel flow condition 450 may differ in pressure, flow, or another fuel parameter due to increased efficiency of the fuel system, the fuel nozzle, the combustion section, and/or the engine generally. In various embodiments, the first fuel flow condition 410 includes a second pre-cleaning pressure parameter relative to the first injector. The fifth fuel flow condition 450 includes a second post-cleaning pressure parameter relative to the first injector. The second post-cleaning pressure parameter at the first injector is less than the second pre-cleaning pressure parameter at the first injector. In certain embodiments, the pre-cleaning pressure parameter and the post-cleaning pressure parameter corresponds to a delta pressure (dP) between an exit of the fuel nozzle (e.g., pressure at the combustion chamber) versus an upstream fuel pressure, such as at the fuel system. The decreased dP may be indicative of the cleaned fuel injector. However, in certain embodiments, the method 1000 may include returning from step 1060 to step 1050, or returning from step 1060 to step 1040 then step 1050, or returning from step 1060 to step 1040, step 1045, then step 1050, such as to repeat the cleaning process at the first injector.

In still particular embodiments, the fifth fuel flow condition 450 may correspond to a new or altered nominal fuel flow condition different from another nominal fuel flow condition (e.g., at the first fuel flow condition 410). For instance, as the fifth fuel flow condition 450 follows one or both cleaning steps (e.g., at the second and fourth fuel flow conditions 420, 440), the fifth fuel flow condition 450 may correspond to a condition at or after which the engine 15, propulsion system 10, or aircraft 100 may proceed with normal operation.

In one embodiment, the method 1000 further includes at 1055 transitioning from the fourth fuel flow condition 440 to the fifth fuel flow condition 450, such as depicted at 449 in graph 400. In various embodiments, the method 1000 at 1055 occurs while maintaining an approximately equal or unchanged fuel-oxidizer ratio at the combustion chamber during transition from the fourth fuel flow condition 440 to the fifth fuel flow condition 450. In various embodiments, the method 1000 at 1055 is performed similarly as described in regard to steps 1025, 1035, or 1045.

It should be appreciated that, in various embodiments, the method 1000 includes adjusting the fuel flow rate A and the fuel flow rate B substantially simultaneously to maintain an approximately steady fuel-oxidizer ratio at the combustion chamber when transitioning between the fuel flow conditions such as described herein. It should further be appreciated that simultaneous adjustment or transitioning may include altering the fuel flow rates at different absolute rates of increase or decrease, such as to allow for substantially even or steady-state fuel-oxidizer ratio at the combustion chamber.

Various embodiments of the method 1000 described in regard to one or more of steps 1020, 1025, 1030, 1035, 1040, 1045, or 1050, or other steps as may be described herein, may include operating the compressor section to produce and provide the flow of oxidizer defining the first oxidizer flow condition, such as described in regard to step 1010. In a particular embodiment, the first oxidizer flow condition corresponds to a steady state inlet condition of oxidizer into the compressor section. The steady state inlet condition of oxidizer into the compressor section may correspond to one or more of a substantially steady or unchanging ambient temperature, pressure, density, humidity, or other ambient environmental parameter of oxidizer (e.g., ambient air) entering the compressor section (e.g., at or proximate to the inlet 18, or generally forward or upstream of the compressor section 42 and/or fan assembly 14 depicted in FIG. 2).

In certain embodiments, the substantially steady state condition may generally correspond to substantially level flight or unchanging altitude or attitude. In one embodiment, the steady state inlet condition corresponds to a cruise condition of an aircraft including an engine configured to execute steps of the method 1000. In other embodiments, the steady state inlet condition may correspond to an idle operating condition, such as during ground operation of an aircraft or engine, or an in-flight or altitude low-power operation of the engine. In still other embodiments, however, the steady state inlet condition may correspond to a part-power operating condition (e.g., climb, descent, approach, etc., or generally less than 100% power) or a full-power operating condition (e.g., takeoff power).

In yet another embodiment, the method 1000 may include at 1005 operating the compressor section to produce or provide the flow of oxidizer at an initial oxidizer flow condition in which the initial oxidizer flow condition precedes the first oxidizer flow condition. In certain embodiments, the initial oxidizer flow condition corresponds to a transient inlet condition of oxidizer into the compressor section. For example, the transient inlet condition of oxidizer may correspond to changes in ambient oxidizer conditions entering the compressor section. Transient inlet conditions may correspond to changes in temperature, pressure, density, humidity, or other ambient environmental parameter of oxidizer (e.g., ambient air) entering the compressor section. Transient inlet conditions may correspond to changes in altitude of attitude of an aircraft including an engine configured to execute steps of the method 1000.

Referring back to graph 400, certain embodiments of the method 1000 include operating the fuel system and the compressor section for periods of time corresponding to one or more of the modes of operation described herein. In various embodiments, a period of time may be applied to each respective fuel flow condition, such as depicted in regard to 410, 420, 430, 440, 450. The period of time may include a predetermined period of time at one or more of respective steps 1030, 1050, during which thermal decomposition of fuel or other matter in the respective fuel injector may form. In still certain embodiments, the period of time is bounded by a time threshold corresponding to a health parameter of one or more components of the combustion section and/or downstream components (e.g., the turbine section). In various embodiments, the health parameter of the one or more components corresponds to a combustor heat shield, a combustor liner, the fuel nozzle, a turbine nozzle, vane, or blade, or a desired life or retention parameter for a thermal barrier coating (TBC) or low-observable coating, or other applicable components at or downstream of the combustion section.

In particular embodiments, the method 1000 includes at 1015 determining whether operating the compressor section at the first oxidizer flow condition at 1010 and operating the fuel system at one or more of the fuel flow conditions described in regard to steps 1020, 1025, 1030, 1035, 1040, 1045, 1050, 1055, or 1060, or other steps herein, is within a cleaning envelop. In one embodiment, the cleaning envelop is indicative of the flow of oxidizer being at the first oxidizer flow condition such as described herein, the first fuel flow being at a steady-state condition for a predetermined period of time, and further including the health parameter such as described herein. In certain embodiments, the health parameter corresponds to one or more of a compressor section exit temperature of the flow of oxidizer (e.g., $T3_{oxidizer}$), a compressor section exit pressure of the flow of oxidizer (e.g., $P3_{oxidizer}$), a compressor section exit flow rate of the flow of oxidizer (e.g., $W3_{oxidizer}$), a fuel-oxidizer ratio at the combustion chamber, the first fuel flow condition (e.g., $W_{fuelA}$, $P_{fuelA}$, $T_{fuelA}$, etc., $W_{fuelB}$, $P_{fuelB}$, $T_{fuelB}$, etc.), or combinations thereof. In certain embodiments, operating the fuel system at the second fuel flow condition 420 occurs after determining that the first oxidizer flow condition and the first fuel flow condition 410 are within the cleaning envelop.

In still certain embodiments, the cleaning envelop is indicative of the engine 15 and/or aircraft 100 being in an operational or environmental condition allowing for steps of the method 1000 to be performed within limits related to certain emissions or noise limits, such as described herein. In various embodiments, the cleaning envelop provides a threshold at which the adjusted operation of the engine, such as via the different fuel flow conditions, may be performed while operating within desired emissions and/or noise limits. In certain embodiments, the cleaning envelop may limit the period of time at which one or more of the fuel flow conditions is operated, based on certain emissions and/or noise limits during engine or aircraft operation.

Referring back to FIGS. 1-3, the aircraft 100, the engine 15, and/or the fuel system 90 may include a controller 210 configured to execute one or more steps of embodiments of the method 1000 provided herein. In various embodiments, the controller 210 can generally correspond to any suitable processor-based device, including one or more computing devices. For instance, FIG. 2 illustrates one embodiment of suitable components that can be included within the controller 210. As shown in FIG. 2, the controller 210 can include a processor 212 and associated memory 214 configured to perform a variety of computer-implemented functions. In various embodiments, the controller 210 may be configured to operate the aircraft 100, the propulsion system 10, the engine 15, and/or the fuel system 90 including the fuel nozzle 60, such as shown and described herein and such as according to one or more steps of the method 1000.

As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the controller 210 may include one or more of a full authority digital engine controller (FADEC), a propeller control unit (PCU), an engine control unit (ECU), or an electronic engine control (EEC). In still various embodiments, the controller 210 may define a distributed network of controllers 210, or a distributed network of shared, dedicated, or grouped processors 212 or a network of memory 214 storage networked in clusters physically at the aircraft 100, the propulsion system 10, or the engine 15, or physically detached or remote therefrom (e.g., at a ground-based or satellite-based location).

As shown, the controller 210 may include control logic 216 stored in memory 214. For example, the control logic 216 may define firmware configured to execute instructions for cleaning a fuel nozzle during operation of an engine, such as provided in regard to one or more steps of the method 1000. The control logic 216 may include instructions that when executed by the one or more processors 212 cause the one or more processors 212 to perform operations, such as steps of the method 1000 depicted and described herein.

In various embodiments, the controller 210 may include at the memory 214 a predetermined table, chart, schedule, function, transfer or feedback function, etc. of fuel flow conditions, rates or rates of change of transition between fuel flow conditions, fuel parameters, cleaning envelop, environmental parameters, health parameters, or periods of time at or over which one or more steps of the method 1000 are executed.

Additionally, as shown in FIG. 2, the controller 210 may also include a communications interface module 230. In various embodiments, the communications interface module 230 can include associated electronic circuitry (e.g., interface circuitry) that is used to send and receive data. As such, the communications interface module 230 of the controller 210 can be used to receive data from the aircraft 100, the propulsion system 10, the engine 15, and/or the fuel system 90, such as, but not limited to, a compressor section exit temperature of the flow of oxidizer (e.g., $T3_{oxidizer}$), a compressor section exit pressure of the flow of oxidizer (e.g., $P3_{oxidizer}$), a compressor section exit flow rate of the flow of oxidizer (e.g., $W3_{oxidizer}$), a fuel-oxidizer ratio at the combustion chamber, the first fuel flow condition (e.g., $W_{fuelA}$, $P_{fuelA}$, $T_{fuelA}$, etc., $W_{fuelB}$, $P_{fuelB}$, $T_{fuelB}$, etc.), a fuel parameter, cleaning envelop, environmental parameter, health parameters, or timers associated with one or more periods of time described herein, etc. The communications interface module 230 may particularly send and receive data to and from the control logic 216 stored in the memory 214.

It should be appreciated that the communications interface module 230 can be any combination of suitable wired and/or wireless communications interfaces and, thus, can be communicatively coupled to one or more components of the aircraft 100, propulsion system 10, engine 15 or fuel system 90 via a wired and/or wireless connection. As such, the controller 210 may operate, modulate, control, adjust, alter, or transition operation of the aircraft 100, propulsion system 10, engine 15, fuel nozzle 60, and/or fuel system 90, such as according to one or more steps of the method 1000 provided herein.

Various embodiments of the engine 15, fuel system 90, aircraft 100, controller 210, and method 1000 provided herein may provide advantageous improvements to engine operation by allowing for fuel nozzle cleaning during engine operation. Improvements include allowing for fuel nozzle cleaning, such as via thermal decomposition or break-down of deposits into lighter volatile substances that are able to egress the fuel nozzle, without external pressure system, external cleaning systems, or external cleaning mediums. Embodiments of the method may be performed regularly during operation of the engine, such as during predetermined times, such as to mitigate carbon or other particulate buildup at a fuel nozzle. Furthermore, or alternatively, improvements include reducing or eliminating maintenance tasks related to removing or replacing fuel nozzles from an engine for cleaning. Still further, embodiments of the system and method provided herein may improve life, durability, maintenance, and/or performance of other combustion section and/or turbine section components, such as by reducing or eliminating uneven fuel nozzle spray patterns, reducing circumferential and/or radial thermal gradient variations (e.g., reducing hot spots), or reducing other conditions that may cause uneven or increased wear or deterioration of certain combustion section or turbine section components.

Although depicted in regard to propulsion gas turbine engines, systems and methods depicted and described herein may be applied generally to turbomachines, gas turbine engines, Brayton cycle machines, or heat engines generally including a fuel nozzle with a first fuel circuit, conduit, or injector separately controllable from a second fuel circuit, conduit, or injector. Furthermore, or alternatively, embodiments of systems and methods provided herein may be applied to non-propulsion engines, such as, but not limited to, industrial gas turbine engines, auxiliary power units, marine gas turbine engines, land-based gas turbine engines, etc. In such embodiments, it should be appreciated that limits to emissions or noise described herein in regard to an aircraft (e.g., the LTO cycle) may utilize other emissions or noise limits, such as, but not limited to, limits generally related to greenhouse gases, local ordinances, or other regulations.

However, although embodiments of systems and methods provided herein may be applied to non-propulsion engines, it should be appreciated that certain particular advantages provided herein are allowed for propulsion systems during operation, or during flight, that may not be allowed or contemplated by cleaning systems or methods for non-propulsion engines. Furthermore, it should be appreciated that engine operation during flight, and methods therefor, including changes between transient inlet conditions and steady-state inlet conditions such as described herein, provide complexities and potential issues unlike those for non-propulsion engines or engines for non-aircraft systems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A heat engine comprising a compressor section configured to provide a flow of oxidizer to a combustion chamber; a fuel nozzle comprising a plurality of fuel injection openings, wherein the fuel nozzle is configured to provide a first fuel flow to the combustion chamber through one or more of the fuel injector openings and a second fuel flow to the combustion chamber through one or more of the fuel injector openings different from the first fuel flow; a fuel system comprising a first conduit configured to provide the first fuel flow to the combustion chamber and a second conduit configured to provide the second fuel flow to the combustion chamber, wherein the fuel system is configured to provide the first fuel flow variably and separate from the second fuel flow; and a controller configured to execute operations, the operations comprising operating the compressor section to provide the flow of oxidizer at a first oxidizer flow condition to the combustion chamber, wherein the first oxidizer flow condition comprises an environmental parameter; operating the fuel system at a first fuel flow condition to produce a fuel-oxidizer ratio at the combustion chamber; comparing the environmental parameter to a first environmental parameter threshold; and transitioning the fuel system to a second fuel flow condition corresponding to a cleaning condition at the fuel nozzle if the environmental parameter is equal to or greater than the first environmental parameter threshold.

2. The heat engine of any clause herein, wherein the environmental parameter comprises a temperature parameter and a pressure parameter.

3. The heat engine of any clause herein, wherein the environmental parameter corresponds to a location at the heat engine downstream of the compressor section and upstream of the combustion chamber.

4. The heat engine of any clause herein, comparing the environmental parameter to a second environmental parameter threshold and transitioning the fuel system to a second fuel flow condition corresponding to the cleaning condition at the fuel nozzle if the environmental parameter is less than or equal to the second environmental parameter threshold.

5. The heat engine of any clause herein, wherein the first environmental parameter threshold corresponds to one or more of a temperature of the flow of oxidizer of 550 F or greater or a pressure of 135 psi or greater downstream of the compressor section and upstream of the combustion chamber.

6. The heat engine of any clause herein, wherein the second environmental parameter threshold corresponds to one or more of the temperature of the flow of oxidizer of 1250 F or less or the pressure of 315 psi or less downstream of the compressor section and upstream of the combustion chamber.

7. The heat engine of any clause herein, the operations comprising comparing a health parameter to a health parameter threshold, wherein the health parameter corresponds to one or more of a combustor component temperature, a combustion thermal gradient, a combustor stability parameter, or an emissions parameter.

8. The heat engine of any clause herein, wherein transitioning the fuel system to the second fuel flow condition corresponding to a cleaning condition occurs if the health parameter is within the health parameter threshold.

9. The heat engine of any clause herein, wherein the emissions parameter corresponds to an emissions output versus flight mode, wherein the flight mode corresponds to an emissions environment.

10. The heat engine of any clause herein, wherein the cleaning condition comprises operating the fuel system at a second fuel flow condition.

11. The heat engine of any clause herein, wherein the cleaning condition comprises flowing, through the fuel nozzle, a purge fluid through the fuel nozzle.

12. The heat engine of any clause herein, wherein flowing the purge fluid comprises continuously flowing for a predetermined period of time of at least a portion of the flow of oxidizer to remove the thermal decomposition deposit from the fuel nozzle.

13. The heat engine of any clause herein, wherein operating the fuel system at the second fuel flow condition comprises reducing the second fuel flow to zero and increasing the first fuel flow to equal the fuel-oxidizer ratio at the combustion chamber at the first fuel flow condition.

14. The heat engine of any clause herein, wherein flowing the purge fluid comprises operating the fuel system at a third fuel flow condition after operating the fuel system at the second fuel flow condition, wherein the third fuel flow condition and the first oxidizer flow condition together provide the fuel-oxidizer ratio at the combustion chamber as the first fuel flow condition and the first oxidizer flow condition.

15. The heat engine of any clause herein, wherein the first fuel flow condition corresponds to a cruise operating condition.

16. The heat engine of any clause herein, wherein the first oxidizer flow condition corresponds to a steady state inlet condition of oxidizer into the compressor section.

17. The heat engine of any clause herein, wherein the steady state condition corresponds to an idle operating condition, a part-power operating condition, or a full-power operating condition.

18. The heat engine of any clause herein, the operations comprising operating the compressor section to provide the flow of oxidizer at an initial oxidizer flow condition, wherein the initial oxidizer flow condition precedes the first oxidizer flow condition.

19. The heat engine of any clause herein, wherein the initial oxidizer flow condition corresponds to a transient inlet condition of the flow of oxidizer into the compressor section.

20. The heat engine of any clause herein, wherein the plurality of fuel injection openings comprises a main fuel injector and a pilot fuel injector.

21. The heat engine of any clause herein, the operations comprising determining whether operating the compressor section at the first oxidizer flow condition and operating the fuel system at the first fuel flow condition is within a cleaning envelop comprising one or more of a compressor section exit temperature of the flow of oxidizer, a compressor section exit pressure of the flow of oxidizer, a ratio of the total fuel flow and flow of oxidizer at the combustion chamber, or the first fuel flow condition.

22. The heat engine of any clause herein, wherein operating the fuel system at the second fuel flow condition occurs after determining that the first oxidizer flow condition and the first fuel flow condition are within the cleaning envelop.

23. A controller for a heat engine, the controller configured to execute operations, the operations comprising operating a compressor section at a steady state inlet condition of oxidizer into the compressor section to provide a flow of oxidizer at a first oxidizer flow condition to a combustion chamber; operating a fuel system at a first fuel flow condition, wherein the first fuel flow condition comprises a first fuel flow rate A of the first fuel flow through a first injector at a fuel nozzle and a first fuel flow rate B of the second fuel flow through a second injector at the fuel nozzle, and wherein the first fuel flow condition provides a fuel-oxidizer ratio at the combustion chamber comprising the first fuel flow and the second fuel flow; operating the fuel system at a second fuel flow condition while operating the compressor section at the first oxidizer flow condition, wherein the second fuel flow condition comprises a second fuel flow rate A of the first fuel flow through the first injector and a second fuel flow rate B of the second fuel flow through the second injector, wherein the second fuel flow condition provides the fuel-oxidizer ratio at the combustion chamber equal between the first fuel flow condition and the second fuel flow condition; and operating the fuel system at a third fuel flow condition after operating the fuel system at the second fuel flow condition, wherein the third fuel flow condition comprises a third fuel flow rate A of the first fuel flow through the first injector and a third fuel flow rate B of the second fuel flow through the second injector.

24. The controller of any clause herein, the operations comprising determining whether operating the compressor section at the first oxidizer flow condition and operating the fuel system at the first fuel flow condition is within a cleaning envelop comprising one or more of a compressor section exit temperature of the flow of oxidizer, a compressor section exit pressure of the flow of oxidizer, fuel-oxidizer ratio at the combustion chamber, or the first fuel flow condition.

25. The controller of any clause herein, wherein operating the fuel system at the second fuel flow condition occurs after determining that the first oxidizer flow condition and the first fuel flow condition are within the cleaning envelop.

26. The controller of any clause herein, the operations comprising operating the fuel system at a fourth fuel flow condition while operating the compressor section at the first oxidizer flow condition, wherein the fourth fuel flow condition comprises a fourth fuel flow rate A of the first fuel flow through the first injector and a fourth fuel flow rate B of the second fuel flow through the second injector, wherein the fourth fuel flow condition provides the fuel-oxidizer ratio to the combustion chamber, and wherein the fourth fuel flow rate A is less than the first fuel flow rate A, and wherein the fourth fuel flow rate B is greater than the first fuel flow rate B, and wherein the fuel-oxidizer ratio at the combustion chamber is approximately equal at the first fuel flow condition and the fourth fuel flow condition.

27. The controller of any clause herein, the operations comprising adjusting the fuel flow rate A and the fuel flow rate B simultaneously to maintain an approximately steady fuel-oxidizer ratio at the combustion chamber when transitioning between two or more fuel flow conditions.

28. A method for cleaning a fuel nozzle during engine operation, the method comprising one or more steps of the operations of any clause herein.

29. A method for cleaning a fuel nozzle during in-flight operation of an aircraft, the method comprising one or more steps of the operations of any clause herein.

30. An aircraft comprising a propulsion system, the propulsion system comprising the heat engine of any clause herein.

31. An aircraft comprising a heat engine, the heat engine comprising the controller of any clause herein.

32. An aircraft comprising the controller of any clause herein.

33. A propulsion system comprising the controller of any clause herein.

What is claimed is:

1. A heat engine, the heat engine comprising:
   a compressor section configured to provide a flow of oxidizer to a combustion chamber;
   a fuel nozzle comprising a plurality of fuel injection openings, wherein the fuel nozzle is configured to provide a first fuel flow to the combustion chamber through one or more of the fuel injection openings and a second fuel flow to the combustion chamber through one or more of the fuel injection openings different from the first fuel flow;
   a fuel system configured to provide the first fuel flow through the fuel nozzle variably and separate from the second fuel flow through the fuel nozzle; and
   a controller configured to execute operations, the operations comprising:
      operating the compressor section to provide the flow of oxidizer at a first oxidizer flow condition to the combustion chamber, wherein the first oxidizer flow condition comprises an environmental parameter, wherein the environmental parameter comprises a temperature parameter and a pressure parameter;

operating the fuel system at a first fuel flow condition to produce a fuel-oxidizer ratio at the combustion chamber;

comparing the environmental parameter to a first environmental parameter threshold;

comparing the environmental parameter to a second environmental parameter threshold; and transitioning the fuel system to a second fuel flow condition corresponding to a cleaning condition at the fuel nozzle if (i) the environmental parameter is equal to or greater than the first environmental parameter threshold, and (ii) the environmental parameter is less than or equal to the second environmental parameter threshold, wherein the first environmental parameter threshold corresponds to one or more of a temperature of the flow of oxidizer of 550° F. or greater or a pressure of 135 psi or greater downstream of the compressor section and upstream of the combustion chamber.

2. The heat engine of claim 1, wherein the environmental parameter corresponds to a location at the heat engine downstream of the compressor section and upstream of the combustion chamber.

3. The heat engine of claim 1, wherein the second environmental parameter threshold corresponds to one or more of a temperature of the flow of oxidizer of 1250° F. or less or a pressure of 315 psi or less downstream of the compressor section and upstream of the combustion chamber.

4. The heat engine of claim 1, the operations comprising:
comparing a health parameter to a health parameter threshold, wherein the health parameter corresponds to one or more of a combustor component temperature, a combustion thermal gradient, a combustor stability parameter, or an emissions parameter.

5. The heat engine of claim 4, wherein transitioning the fuel system to the second fuel flow condition corresponding to the cleaning condition occurs after the health parameter is compared to the health parameter threshold.

6. The heat engine of claim 4, wherein the emissions parameter corresponds to an emissions output, which is a function of a flight mode, wherein the flight mode defines an emissions environment at which the cleaning condition can be executed.

7. The heat engine of claim 1, wherein the cleaning condition comprises:
flowing, through the fuel nozzle, a purge fluid through the fuel nozzle.

8. The heat engine of claim 7, wherein flowing the purge fluid comprises continuously flowing for a predetermined period of time of at least a portion of the flow of oxidizer to remove fuel deposits from the fuel nozzle.

9. The heat engine of claim 7, wherein flowing the purge fluid comprises:
operating the fuel system at a third fuel flow condition after operating the fuel system at the second fuel flow condition, wherein the third fuel flow condition and the first oxidizer flow condition together provide the fuel-oxidizer ratio at the combustion chamber as the first fuel flow condition and the first oxidizer flow condition.

10. The heat engine of claim 1, wherein operating the fuel system at the second fuel flow condition comprises reducing the second fuel flow to zero and increasing the first fuel flow to equal the fuel-oxidizer ratio at the combustion chamber at the first fuel flow condition.

11. The heat engine of claim 1, wherein the first fuel flow condition corresponds to a cruise operating condition.

12. The heat engine of claim 1, wherein the first oxidizer flow condition corresponds to a steady state inlet condition of oxidizer into the compressor section.

13. The heat engine of claim 12, wherein the steady state inlet condition corresponds to an idle operating condition, a part-power operating condition, or a full-power operating condition.

14. The heat engine of claim 1, the operations comprising:
operating the compressor section to provide the flow of oxidizer at an initial oxidizer flow condition, wherein the initial oxidizer flow condition precedes the first oxidizer flow condition.

15. The heat engine of claim 14, wherein the initial oxidizer flow condition corresponds to a transient inlet condition of the flow of oxidizer into the compressor section.

16. The heat engine of claim 1, wherein the plurality of fuel injection openings comprises a main fuel injector and a pilot fuel injector.

* * * * *